United States Patent
Lugo et al.

(10) Patent No.: US 11,797,079 B2
(45) Date of Patent: Oct. 24, 2023

(54) VARIABLE EFFECTS ACTIVATION IN AN INTERACTIVE ENVIRONMENT

(71) Applicant: Universal City Studios LLC, Universal City, CA (US)

(72) Inventors: Victor Lugo, Orlando, FL (US); William Wilson, Orlando, FL (US); Hannah Pogue, Orlando, FL (US); Jacob Edelen, Orlando, FL (US); Charles Babb, Orlando, FL (US); Robert Wiedemann, Orlando, FL (US); Robert Michael Jordan, Orlando, FL (US); Michelle Smith, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/585,237

(22) Filed: Jan. 26, 2022

(65) Prior Publication Data
US 2022/0244775 A1 Aug. 4, 2022

Related U.S. Application Data

(60) Provisional application No. 63/143,214, filed on Jan. 29, 2021.

(51) Int. Cl.
*G06F 3/01* (2006.01)
(52) U.S. Cl.
CPC .................................. *G06F 3/011* (2013.01)
(58) Field of Classification Search
None
See application file for complete search history.

(56) References Cited

U.S. PATENT DOCUMENTS

| | | | |
|---|---|---|---|
| 8,457,353 B2 | 6/2013 | Reville et al. | |
| 8,631,355 B2 | 1/2014 | Murillo et al. | |
| 10,265,621 B2 | 4/2019 | Goslin et al. | |
| 10,453,453 B2 | 10/2019 | Penilla et al. | |
| 2011/2373380 * | 11/2011 | Martin | G06F 3/041 |
| | | | 345/173 |
| 2011/0313768 A1* | 12/2011 | Klein | G06F 3/017 |
| | | | 715/728 |
| 2012/0309535 A1 | 12/2012 | Langridge et al. | |
| 2015/0261318 A1 | 9/2015 | Scavezze et al. | |
| 2016/0206955 A1 | 7/2016 | Goslin et al. | |

(Continued)

OTHER PUBLICATIONS

PCT/US2022/014348 Invitation to Pay Additional Fees mailed May 23, 2022.

*Primary Examiner* — Aneeta Yodichkas
(74) *Attorney, Agent, or Firm* — Fletcher Yoder, P.C.

(57) ABSTRACT

A variable effect activation system includes one or more sensors that generate data. The data can be assessed to determine if the data is indicative of a valid input to an interactive effect. Valid inputs may be assessed based on a lenient or relatively non-stringent threshold to permit a wide variety of guest actions to be considered valid inputs. While many of these guest actions may not be recognized as part of preprogrammed interactions with an interactive environment, the system nonetheless assesses characteristics of these inputs to provide an appropriate response, e.g., via activation of an interactive effect in a manner that aligns with the characteristics.

22 Claims, 6 Drawing Sheets

(56) References Cited

U.S. PATENT DOCUMENTS

2019/0201806 A1 7/2019 Weston
2020/0175961 A1* 6/2020 Thomson ................ G10L 15/28
2020/0333875 A1* 10/2020 Bansal ................... G06F 9/3836

* cited by examiner

VARIABLE EFFECTS ACTIVATION IN AN INTERACTIVE ENVIRONMENT

CROSS-REFERENCE TO RELATED APPLICATIONS

This application claims priority from and the benefit of U.S. Provisional Application No. 63/143,214, entitled "VARIABLE EFFECTS ACTIVATION IN AN INTERACTIVE ENVIRONMENT," filed Jan. 29, 2021, which is hereby incorporated by reference in its entirety for all purposes.

BACKGROUND

The present disclosure relates generally to interactive environments, such as a game environment or an amusement park. More specifically, embodiments of the present disclosure relate to activation of effects in interactive environments in a manner that may be personalized to guest characteristics and/or actions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, interactive environments where guests can interact with an attraction through a handheld object, such as a themed prop or toy. For example, an interactive environment may be designed for use with a handheld prop or object that the guest uses to perform actions, such as swinging a sword or throwing a ball. The guest actions with the handheld objects may result in visible effects within the interactive environment that are tied to the guest's own actions, facilitating a more realistic experience. However, the range of interactive effects may be triggered by specific interaction patterns in the interactive environment, such that the handheld objects may only generate effects based on following pre-programmed interactions with the environment. While such techniques may provide entertainment for the guest, it is presently recognized that advancements may be made to further immerse the guest within the particular attraction, ride, or interactive experience of an interactive environment and permit a more varied and unpredictable guest experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a variable interactive effect system for controlling activation of an interactive effect includes one or more sensors configured to generate a signal. The system also includes a system controller configured to receive the signal. The system controller is configured to validate the signal as being valid input for the interactive effect, determine whether the validated signal matches at least one preprogrammed interaction of the interactive effect, determine a score based on one or more metrics of the validated signal, and generate instructions to control the interactive effect based the score and on whether the validated signal matches the at least one preprogrammed interaction of the interactive effect. The instructions include first variable activation instructions when the validated signal matches the at least one preprogrammed interaction of the interactive effect and second variable activation instructions when the validated signal does not match any preprogrammed interaction of the interactive effect. A variable of the first variable activation instructions, the second variable activation instructions, or both is set by the score. The system also includes an interactive effect controller configured to activate the interactive effect based on the first variable activation instructions or the second variable activation instructions In an embodiment, a method of activating an interactive effect includes receiving data from one or more sensors, the data indicative of a valid input from a guest to an interactive effect, estimating a potential input range for the guest based on the data, determining a score for the valid input based on the estimated potential input range and the data, and generating instructions to activate the interactive effect based on the score. The generated instructions adjust an activation level of the interactive effect based on the score.

In an embodiment, a variable interactive effect system for controlling activation of an interactive effect includes a system controller configured to receive input data from one or more sensors in an interactive environment that includes an interactive effect. The system controller is configured to validate the input data as being a valid input to the interactive effect, determine that the input data does not match a preprogrammed interaction with the interactive effect, assess the input data according to one or more metrics to generate a score, and generate instructions to control the interactive effect based the score. A variable of the instructions is set by the score. The system also includes an interactive effect controller configured to activate the interactive effect based on the instructions.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
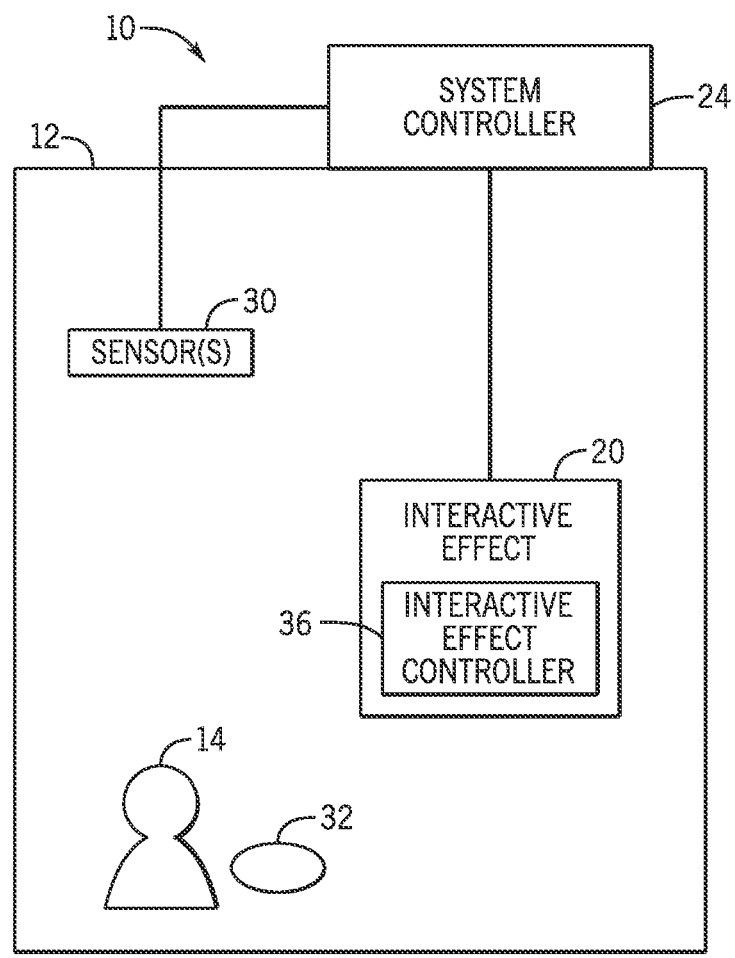
FIG. 1 is a schematic diagram of a variable interactive effect system according to embodiments of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Guests in an interactive environment may enjoy interacting with the environment by performing actions that cause observable changes in the interactive environment. In one example, guests may carry or wear interactive objects (e.g., sword, stuffed toy, hat, wand, jewelry, or other prop) that, in conjunction with the interactive environment, may be used to trigger interactive effects (e.g., interactively activated special effects) that are part of a themed experience. For example, interactive objects may activate a prop element in the interactive environment to move. Such effects may be based on detecting the presence of the interactive object, tracking its movement, and matching the movement to a stored motion pattern. The special effect can be triggered based on an accuracy assessment of the motion pattern relative to the stored motion pattern. In such an example, the guest is provided guidance on the motion pattern and seeks to emulate the pattern to trigger the effect. In another example, the interactive object may be a stuffed toy that the guest moves in a dancing pattern. Successful completion of the dancing pattern may trigger activation of a special video in the interactive environment.

However, some guests may have difficulty following prompts to perform requested actions in a manner that is recognized by the system and may, therefore, not fully enjoy an interactive environment. Guests may also prefer interacting with an interactive environment in a more natural manner that is driven by their abilities and preferences. These effects may, in an embodiment, be performed in conjunction with an interactive object. For example, a very small child may have a favorite stuffed toy and may enjoy dancing with that toy in the interactive environment, but may be disappointed if not able to exactly copy a suggested dancing motion pattern, or the child may wish to perform their own movements in a dance. In another example, a guest may carry a wand and wish to cast a spell of their own devising by moving the wand in a way that feels natural to them and, in an embodiment, using their own recited words. The present techniques provide variable or dynamic effect activation in the interactive environment based on guest natural movement and/or natural actions. The interactive effect actuation accepts as valid input a wide variety of natural guest actions rather than permitting activation only when specific actions are closely matched to stored parameters.

Thus, the present techniques permit guest-driven and, in some embodiments, guest-defined, interactions with the interactive environment that are viable inputs to activate features of the interactive environment, such as interactive effects. The interactive environment responds to the guest to activate effects in a variable manner, in response to variable inputs, and, in an embodiment, in a manner personalized to each guest. Further, because different guests have different ranges of motion, different voice volumes, or different speed and/or strength capabilities, the system can match a dynamic range of a particular effect activation to an individual guest's own range of capabilities. Accordingly, in an embodiment, each guest is able to access the full potential of an interactive effect within their own abilities.

The present techniques reduce the system computing burden and inefficiency of teaching guests to perform specific actions that are acceptable inputs to active features of the interactive environment according to fixed and/or stringent input metrics that may be inappropriate for guests of different abilities and familiarity with the environment. Instead, the variable effect activation system meets guests where they are, permitting interactive effect activation via a variety guest actions that represent genuine interaction attempts. Further, the interactive effect activation is more flexible and accessible for guests with different needs. Guests who prefer to speak instructions may do so, while other guests may prefer to perform gestures or movements. The system need not store different interactive effect responses for all possible permitted inputs. Instead, the system can characterize the guest actions (e.g., intense vs. relaxed, fast vs. slow, large movements vs. small movements) according to an assessment logic and activate the interactive effect based on the assessment, e.g., according to a score. This reduces computational complexity by permitting activation of an interactive effect using a wide variety of inputs. The disclosed techniques can activate an interactive effect without storing separate activation instructions for each potential input and without requiring matching each valid guest input to a particular stored response.

FIG. 1 is a schematic illustration of a variable interactive effect system 10 that may be implemented in an interactive environment 12. The interactive environment 12 may be part of an immersive area, such as an amusement park, an entertainment complex, a retail establishment, etc. The disclosed systems and methods may include at least one interactive environment 12 of a themed area having a common theme or narrative focus and may additionally include different interactive environments 12 within the single themed area. Further, the disclosed systems and methods may include additional or other interactive environments 12 having different themes but that are contained within an immersive area, such as a theme park or entertainment venue. When referring to an interactive environment 12, the interactive environment 12 may include a certain area or geographically-bounded region in which a guest 14 can activate an interactive effect 20 within the region and/or a remote interactive effect 20 that is geographically separated. Further, an interactive environment 12 may also include different locations that are geographically separated from one another or that are dispersed throughout an amusement park. The interactive environment 12 can be part of an amusement attraction, a ride, a virtual/augmented reality experience, a live show, a queue, a dining establishment, etc.

The system 10 includes a system controller 24 that can be co-located in the interactive environment 12 or a remote or distributed controller that is communicatively coupled to the interactive environment 12, e.g., via a wireless or wired connection. The system controller receives signals from one or more sensors 30 in the interactive environment. As discussed herein, the system 10 may accept a wide variety of guest inputs, sensed by the sensors 30, to activate the interactive effect 20. The sensors 30 an include computer vision sensors (e.g., cameras), depth cameras, Light Detection and Ranging (LIDAR) devices, motion sensors, audio sensors, light or optical sensors, radio frequency (RF) sensors (e.g., that receive a unique identifying RF signal from a guest-associated object having a radio-frequency identification (RFID) tag) and so forth.

In an embodiment, the sensors 30 capture data of the guest 14 and/or a guest-associated object 32 in the interactive environment that serves as input to the system 10. The guest-associated object 32 may be a mobile device (e.g., a smart phone), VR/AR glasses, or a handheld or wearable prop or object such as a sword, wand, token, book, ball, or figurine, or wearable objects, such as clothing, jewelry, bracelets, headgear, or glasses. The captured sensor data, e.g., a sensor signal, is passed to the system controller 24, which uses the sensor data to generate variable control instructions to instruct an interactive effect controller 36 of the interactive effect 20 to activate features of the interactive effect 20 in accordance with the instructions.

Figure 2:
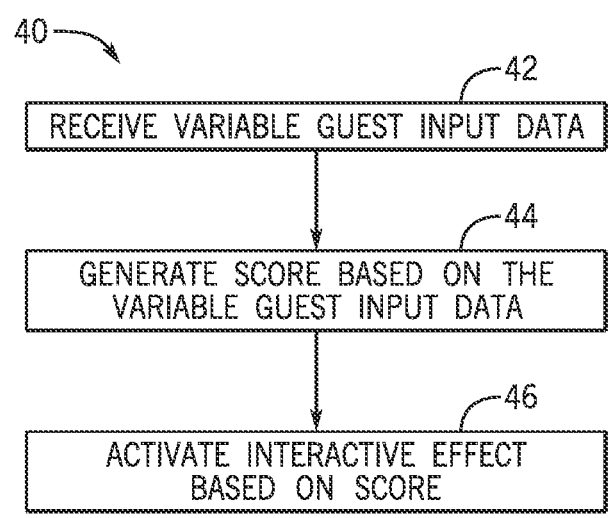
FIG. 2 is a flowchart of a method of activating an interactive energy effect according to embodiments of the disclosure.

In an embodiment, the generated instructions to activate the interactive effect are variable instructions that vary based on the particular guest input. The instructions may, in an embodiment, be generated for each guest interaction with the interactive effect 20. FIG. 2 is a flow diagram of a method 40 of activating an interactive effect that may be performed by the system of FIG. 1. The method 40 includes receiving variable guest input data (block 42) and generating a score based on the variable guest input data (block 44). The score is in turn used to activate the interactive effect (block 46).

Sensor data may be in the form of raw or unprocessed data that is received by the system controller 24 and processed to extract metrics or features. Sensed information in the sensor signal from the sensors 30 may include facial feature data, limb data, movement or gesture data, position data, applied pressure data, speech or voice data, position data, and/or proximity data. Based on this data, the score may be generated. For example, in one example, movement of the guest-associated object is tracked. Detected movement above a first speed may be associated with a first score while movement below that speed is associated with a second score. In this manner, the movement can be scored without performing matching of any particular movement pattern. Faster movements may be associated with higher intensity scores. Similarly, loud or high pitched sensed voice data may be associated with a higher intensity score than lower pitch or quieter voices. Speech speed may also be assessed for signs of stress. The sensor data may be scored according to an intensity metric to generate a score. In one embodiment, the score is scaled, such that the measured intensity is scaled between, for example, 0 and 1.

The generated score may be based on input data that includes both the variable guest input data detected by the sensors 30 as well as other data. In an embodiment, guest identification information, e.g., based on facial recognition or an identifying signal from the guest-associated device, may also be used as part of the activation. Such information may include guest age or profile preferences that are in turn part of a decision process that may be used to adjust an intensity score or to select an appropriate interactive effect activation mode from a stored library.

Figure 3:
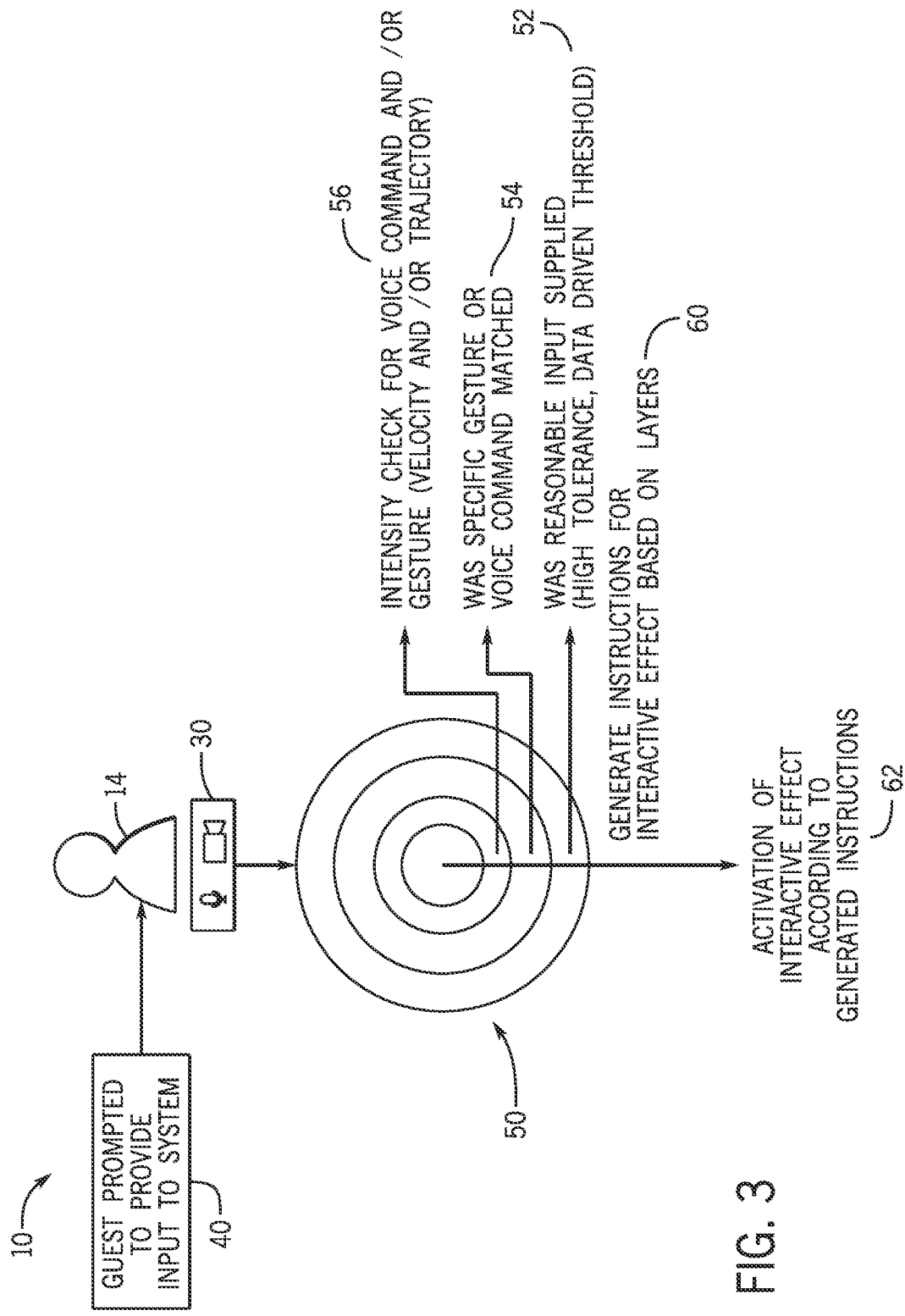
FIG. 3 is a schematic diagram of a variable interactive effect system including a layered assessment logic according to embodiments of the disclosure.

FIG. 3 shows an example of the variable interactive effect system 10 that receives input from a guest 14 to activate the interactive effect 20. In an embodiment, the system 10 may provide a prompt (block 40) the guest 14 to indicate that an interactive feature or effect of the interactive environment is available and to encourage the guest 14 to initiate an action as input to the system 10. Such prompts may be provided via media of the interactive environment, or via a guest device, such as a mobile device, wearable device or other guest-associated object. However, in an embodiment, the system 10 may operate with no prompts. The guest inputs may be guest movement or actions (e.g., gestures, physical interaction with the environment), guest spoken words, or a combination thereof. The system 10 includes one or more sensors 30 that monitor the interactive environment to identify guest inputs. The sensors 30 may be fixed sensors within the interactive environment and/or guest-carried sensors, e.g., sensors of a guest-associated device. The sensors 30 may, upon proximity detection of the guest 14 at an appropriate location within the interactive environment, initiate active monitoring to start sensing the guest input and/or activate any prompts. The prompts provided by the system 10 may include general guidelines for inputs (e.g., "throw the ball!") without specific instructions to match a particular gesture.

The sensor data of the sensors 30 indicative of the guest inputs is provided to a variable activation command logic 50. As illustrated, the logic 50 may include multiple layers. A validation layer 52 (e.g., a first pass layer) assesses the sensor signals to validate if the signals can be considered valid input to activate the interactive effect. Accordingly, the validation layer 52 distinguishes between sensed guest actions that are random and not interactive (walking through the area, speaking to other members of the group) from actions that are intended to be valid interactions. However, the validation layer 52 may be set to have relatively lenient input thresholds to potentially have false positive validated interactions rather than excluding or generating false negatives on intended interactions. Validation may include assessing whether the guest 14 is stationary or stopped within a particular limited geographic area for at least a threshold time window (e.g., at least 10 seconds). The prompt may also include a relatively simple phrase (e.g., "start spell") or gesture (palms together) that, when detected, indicates that subsequent guest actions are intended to be input to the interactive effect. Accordingly, in an embodiment the sensor 30 may include a camera and microphone that detects, with relatively higher stringency, such inputs. The subsequent input, whatever it is, is validated by the validation layer 52. Validation may also incorporate machine learning to distinguish between intended valid inputs and other guest actions and to adjust thresholds based on feedback. The validation layer 52 may provide a binary output of valid or not valid, with only valid inputs being passed on to other layers of the logic 50.

Data from the valid input is assessed by one or more additional layers of the logic 50. It should be understood that the depicted embodiment is one arrangement of the logic 50, and other implementations may include more or fewer layers. In one embodiment, a matching layer 54 performs a matching determination to identify if the input matches a preprogrammed interaction of the interactive effect 20. The matching may include stringent matching to identify a close match to a preprogrammed phrase, gesture (e.g., movement of a wand in a pattern), or less stringent matching to a type of input (speech vs. gesture or a general gesture type). The matching layer 54 may provide an output indicative of match or no match. Further, when there is a match, the matching layer 54 may provide information indicative of the particular matching to the logic 50.

The logic may also include a layer that assesses one or more metrics or characteristics of the guest 14 based on the sensor data. One example is an intensity check layer 56. The intensity may be assessed by absolute or relative measures of a guest voice volume, voice pitch, facial expression, size of gestures, and/or speed of movement.

Accordingly, the logic 50 may generate the following output:
Valid Input
No Match
Intensity Score: 0.8
Based on this output, instructions are generated (block 60) to activate the interactive effect 20 according to the generated instructions (block 62). Based on the intensity score of 0.8, the interactive effect may be activated according to a mode associated with a higher intensity. In another example, the logic 50 may generate an output for a matched interaction (e.g., a guest jump that is detected by characteristic pattern matching from camera data or via a broken beam of an optical sensor) that includes the following indications:
Valid Input
Jump Input Match
Intensity Score: 0.5
Based on the intensity score of 0.5, the interactive effect may be activated according to a mode associated with a medium intensity. The variability between high and medium intensity depends on the nature of the interactive effect 20, but can include a difference in light intensity, a difference in special effects material selected for emission, a difference in selection or speed of played media, a different prop moving or a change in a speed of prop movement, etc., between high and medium intensity responses. Further, the case of match vs. no match may also activate different modes of the interactive effect, e.g., by selecting instructions to active a particular selected mode. Thus, the logic 50 generates a variable score for different guest inputs to active the interactive effect 20.

Where multiple guest inputs indicative of intensity are available (e.g., a shouted phrase and a fast gesture), the logic 50 may select a highest intensity score within the available set of sensor data or average all available intensities to generate an intensity score. Additional information may also be provided to the logic 50 as part of instruction generation. While the depicted embodiment includes the matching layer 54, it should be understood that the logic 50 may also exclude the matching layer 54 and may generate the instructions based on a validated output and an intensity check.

The system 10, for a valid input, may generate at least default activation of the interactive effect 20 if the input data is difficult to score or interpret, e.g., if the sensor is unable to capture sufficient data to estimate intensity. Thus, any valid interaction yields some sort of response from the interactive effect 20 to increase guest enjoyment.

Figure 4:
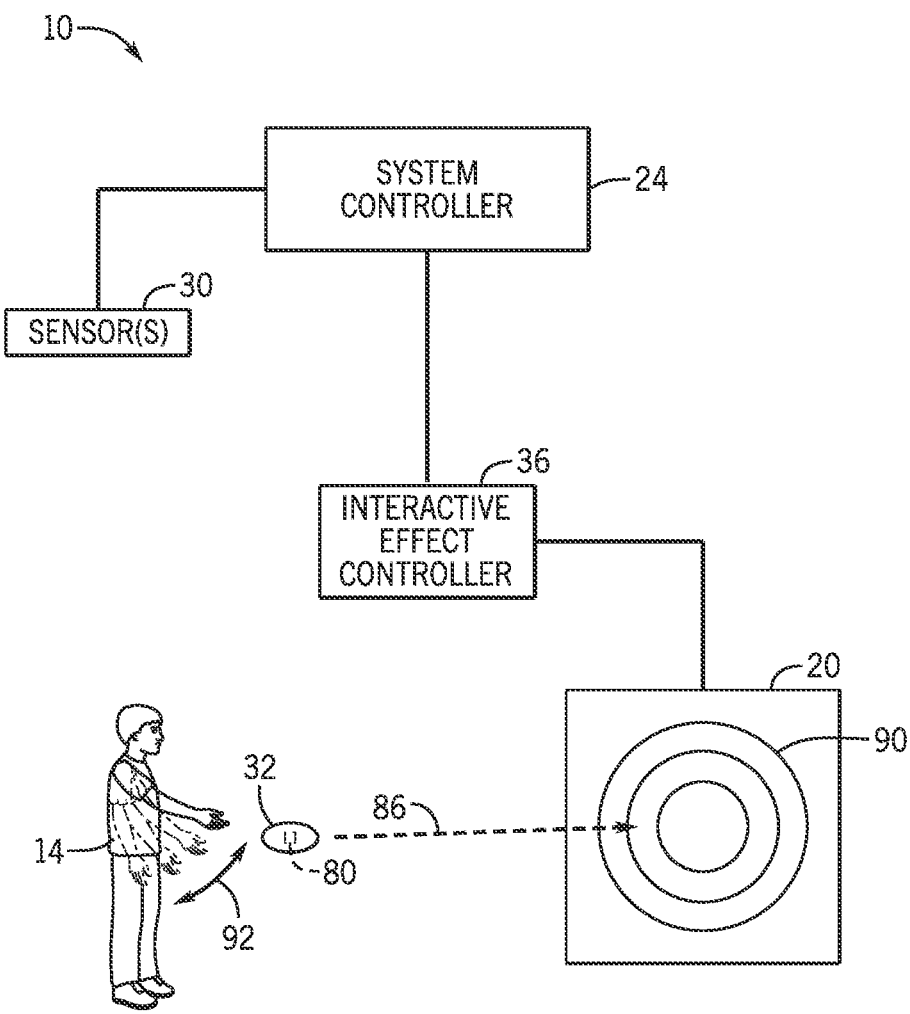
FIG. 4 is a schematic diagram illustrating an interactive effect activation according to embodiments of the disclosure.

FIG. 4 shows an embodiment of the system 10 in which the guest 14 interacts with an interactive effect 20 via a guest-associated object 32. In one embodiment, the guest-associated object includes a marker 80, such as a retroreflective marker, that facilitates identification of the guest-associated object 32 by the sensors 30. In another embodiment, the guest-associated object 32 may communicate position data, including orientation data, or object identification data to the system 10 through wireless transmissions from an RFID tag, or any combination thereof.

The sensor or sensors 30 detect motion of the guest-associated object, shown here as a throwing motion. Based on a detected trajectory 86 and speed, the system controller 24 can instruct the interactive effect controller 36 to adjust displayed media 90 to display elements that match the speed and trajectory of the user-associated object 32. In addition, the intensity check may be assessed based on features of guest movement, such as a total distance 92 by an arm throwing motion.

Figure 5:
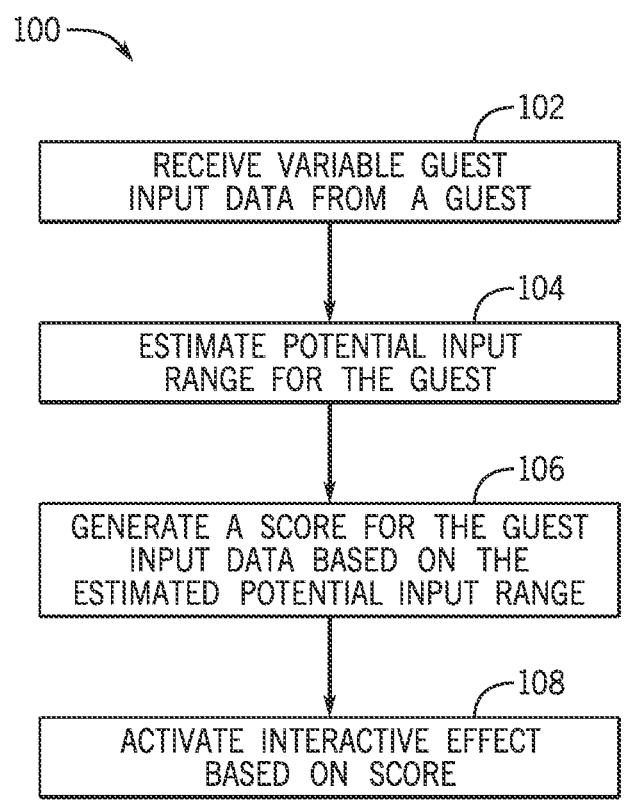
FIG. 5 is a flowchart of a method of activating an interactive energy effect according to embodiments of the disclosure.

The system 10 may be capable of measuring intensity or other input features in a manner personalized to a particular guest's abilities. That is, a similar movement that is intense for one guest may be less intense for a guest more familiar with the narrative. Thus, the system 10 may adjust thresholds based on guest abilities and experiences to provide repeat visitors additional challenges in future visits. FIG. 5 is a flow diagram of a method 100 of activating an interactive effect that may be performed by the system of FIG. 1. The method 100 includes receiving variable guest input data (block 102) and estimates a potential input range for the input for the individual guest (block 104). For example, if the input is a push of a button, and the intensity is measured by an applied pressure, an adult guest would presumably be capable of applying higher pressure than a child guest. Accordingly, a similar pressure value measured from a child and an adult would represent different intensity efforts. The system 10 may estimate an input range for each guest based on guest characteristics and score the input based on the estimated input range to generate a score (block 106). The score is in turn used to activate the interactive effect (block 108).

Figure 6:
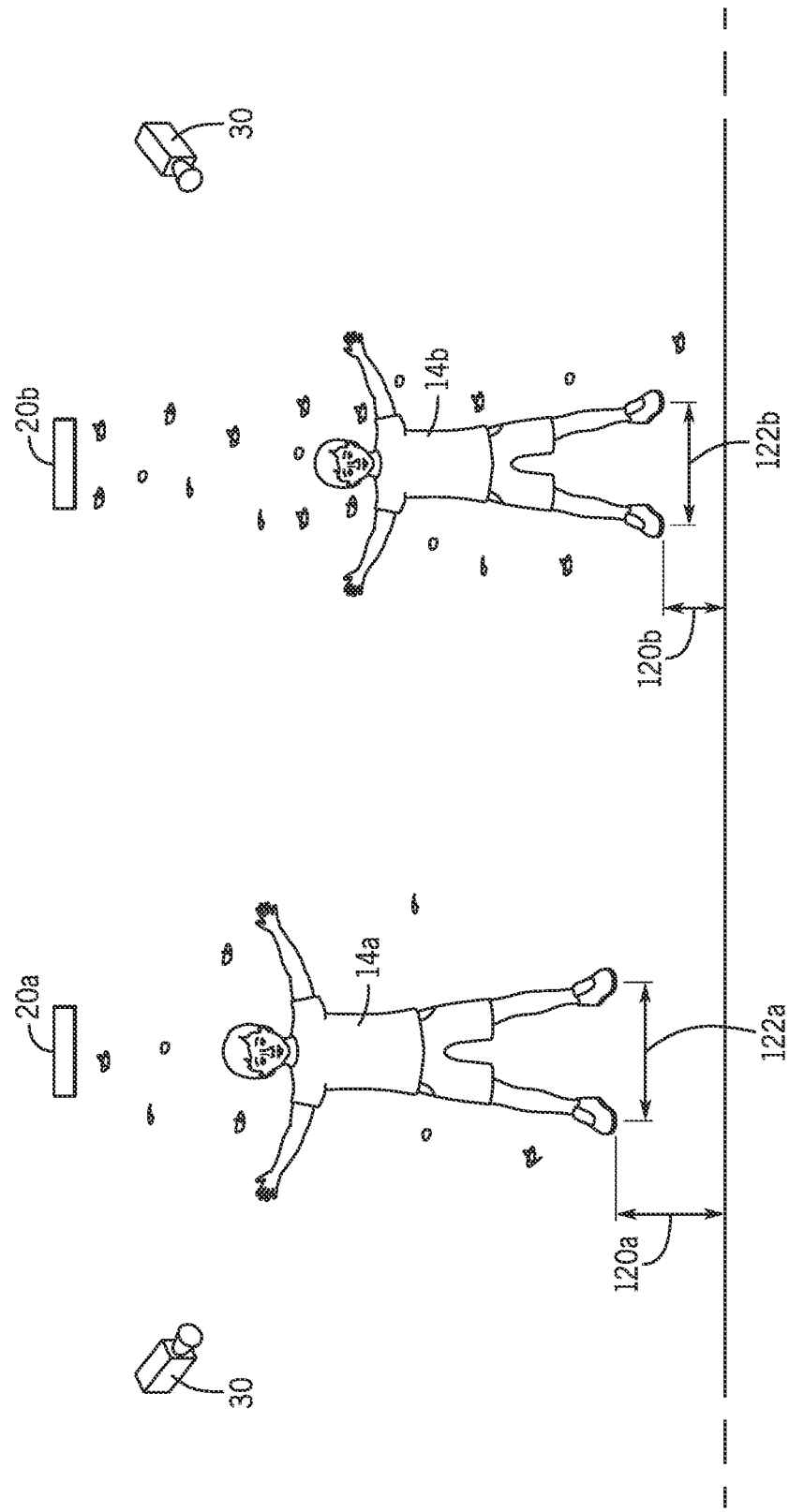
FIG. 6 is a schematic diagram illustrating an interactive effect activation according to embodiments of the disclosure.

FIG. 6 is an example of different interactive effect activation for guests of different abilities. The interactive effect 20 may provide a prompt such as "show us your rain dance or sing a rain song!", and permit inputs of various types to activate the effect 20. Some guests may choose to shout and sing, while others may perform dances of their choosing. Dance intensity or other qualities may be assessed as provided herein, e.g., by tracking motion speed with camera sensors 30. The intensity score of a first guest 14a, an adult, may be adjusted or calibrated such that a same size leap (e.g., as measured via heights 120a, 120b and leg motions 122a, 122b) in a child guest 14b is scored to represent a greater effort or intensity. Accordingly, the interactive effect 20b is activated at a higher intensity (higher intensity rain effect) relative to the interactive rain effect 20a activated by the adult guest 14a.

Figure 7:
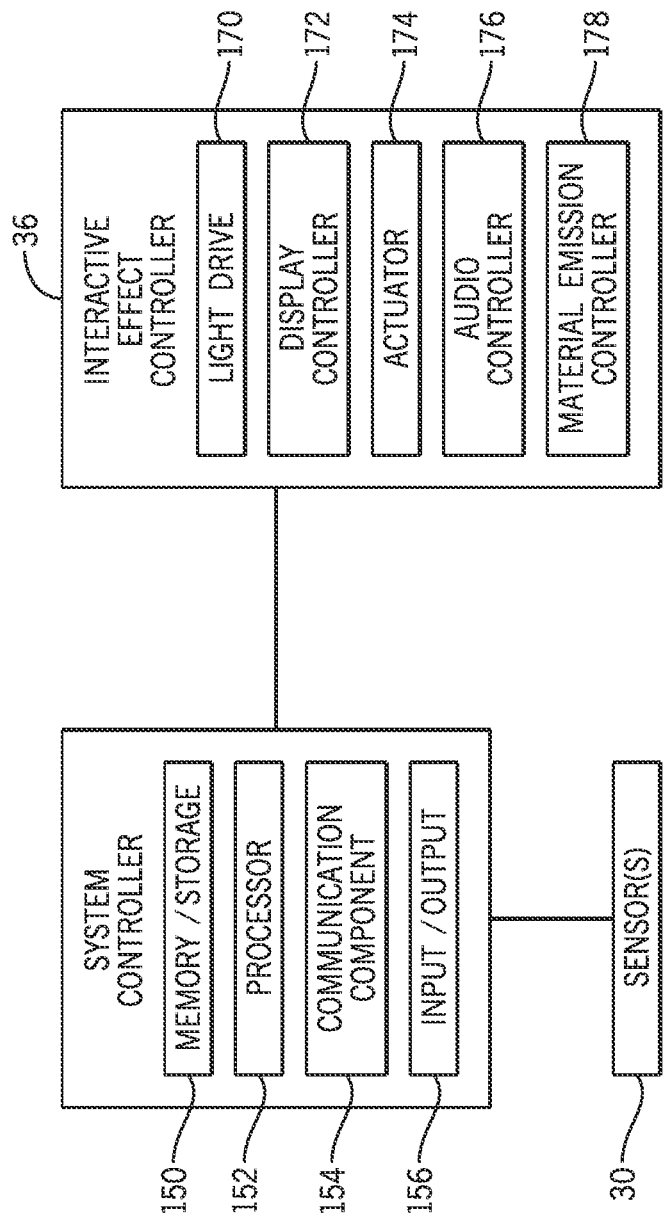
FIG. 7 is a block diagram of the variable interactive effect system according to embodiments of the disclosure.

FIG. 7 is a block diagram of the variable interactive effect system 10 (see FIG. 1). The system 10 includes the system controller 24 (as in FIG. 1) having a memory device 150 and a processor 152, which can include multiple microprocessors, one or more "general-purpose" microprocessors, one or more special-purpose microprocessors, and/or one or more application specific integrated circuits (ASICs), or some combination thereof. For example, the processor 152 may include one or more reduced instruction set computer (RISC) processors. The memory device 150 may include volatile memory, such as random access memory (RAM), and/or nonvolatile memory, such as read-only memory (ROM). The memory device 150 may store information, such as control software (e.g., control algorithms). The communication is then transmitted from the system controller 24 to the interactive effect controller 36. The system controller 24 is in communication with one or more sensors 30 and the interactive effect controller 36 via a communication component 154, and control instruction and parameters may be interacted with via an input/output interface 156.

Based on inputs from the sensors 30, and in certain embodiments from stored information in a guest profile, data is processed by the system 10 to generate instructions for controlling the interactive effect controller 36. The interactive effect controller may include certain features also discussed with respect to the system controller 24, such as a memory, processor, communication, and input/output components.

The instructions cause the interactive effect controller 36 to control the interactive effect 20 according to the available activation modes and the instructions. The generated instructions may cause the active features of the interactive effect 20 to be activated in a particular manner based on the guest input. As discussed herein, such activation is variable, and different guest inputs may result in different activation results. Thus, the interactive effects are unpredictable and more enjoyable.

The depicted features of the interactive effect controller 36 may be present alone or in combination, and are shown by way of example. In one example, the interactive effect controller 36 controls an intensity of one or more light sources. For example, a generated higher intensity score may cause a light drive 170 to increase a light intensity of light sources of the interactive effect, change a color of lights of the interactive effect, or activate more or different light sources. In another example, a display controller 172 may be instructed to display particular media selections based on the instructions. In another example, an actuator 174 may move an actuatable feature of an interactive effect in a variable manner based on the generated instructions. Certain guest inputs may result in a robot being activated to move quickly, while other guest inputs cause the robot to move more slowly. Additional examples may include a variably controlled audio controller 176 and/or a variably controlled material emission controller 178 that controls an emission rate, material choice, and/or volume of an emitted special effects material (e.g., water, fog, snow, confetti).

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A variable interactive effect system for controlling activation of an interactive effect, the system comprising:
one or more sensors configured to generate a signal;
a system controller configured to receive the signal and configured to:
validate the signal as being valid input for the interactive effect;
determine whether the validated signal matches at least one preprogrammed interaction of the interactive effect;
after determining whether the validated signal matches the at least one preprogrammed interaction, determine an intensity score of the validated signal based on evaluating information of the validated signal with one or more intensity metrics to produce the intensity score of the validated signal; and
generate instructions to control the interactive effect based on the intensity score and on whether the validated signal matches the at least one preprogrammed interaction of the interactive effect, wherein the instructions comprise first variable activation instructions configured to cause a first level of activation of the interactive effect associated with the intensity score when the validated signal matches the at least one preprogrammed interaction of the interactive effect and second variable activation instructions configured to cause a second level of activation of the interactive effect associated with the intensity score when the validated signal does not match any preprogrammed interaction of the interactive effect, wherein the first level of activation of the interactive effect is at a different intensity than the second level of activation of the interactive effect; and
an interactive effect controller configured to activate the interactive effect based on the first variable activation instructions or the second variable activation instructions.

2. The variable interactive effect system of claim 1, wherein the one or more sensors comprise image sensors, radio frequency sensors, optical sensors, or any combination thereof.

3. The variable interactive effect system of claim 1, wherein the one or more intensity metrics comprise a voice intensity, a gesture velocity, or a gesture trajectory.

4. The variable interactive effect system of claim 1, wherein validating the signal comprises detecting that a guest is stationary and within a predetermined distance of the interactive effect.

5. The variable interactive effect system of claim 4, wherein the one or more sensors are configured to detect movement of a guest-associated object and wherein the validating the signal further comprises detecting that the movement is nonrandom.

6. The variable interactive effect system of claim 4, wherein the one or more sensors are configured to detect audio signals of the guest and wherein validating the signal further comprises detecting a specific word or phrase in the audio signals.

7. The variable interactive effect system of claim 6, wherein the second variable activation instructions are generated when additional detected words in the validated signal do not match any preprogrammed interaction of the interactive effect.

8. The variable interactive effect system of claim 1, wherein the second variable activation instructions comprise selecting an activation mode of the interactive effect and adjusting a level of activation of the interactive effect based on the intensity score.

9. The variable interactive effect system of claim 1, wherein the first variable activation instructions comprise selecting a mode from a set of available activation modes of the interactive effect based on the match of the at least one preprogrammed interaction and adjusting a level of activation of the interactive effect based on the intensity score.

10. A method of activating an interactive effect, the method comprising:
 receiving data from one or more sensors, the data indicative of a valid input from a guest to an interactive effect, wherein the data comprises a detected value of the valid input from the one or more sensors;
 estimating a potential input range for the guest based at least in part on the data;
 determining an intensity score associated with the detected value within an intensity scale for the valid input based on the estimated potential input range; and
 generating instructions to activate the interactive effect based on the intensity score, wherein the generated instructions adjust an activation level of the interactive effect based on the intensity score.

11. The method of claim 10, wherein the data comprises voice volume or intensity data, and wherein the estimated potential input range comprises an estimated volume range for the guest.

12. The method of claim 10, wherein the data comprises velocity data, and wherein the estimated potential input range comprises an estimated velocity range for the guest.

13. The method of claim 10, wherein the data comprises movement data of the guest or a guest-associated object, and wherein the estimated potential input range comprises an estimated range of motion for the guest.

14. The method of claim 10, wherein adjusting the activation level of the interactive effect comprises adjusting a speed, volume, and/or intensity of the interactive effect to match the intensity score, wherein the activation level is scaled to a range of the intensity score.

15. The method of claim 10, wherein adjusting the activation level of the interactive effect comprises activating media associated with the intensity score.

16. The method of claim 10, wherein adjusting the activation level of the interactive effect comprises matching a light intensity of a light source to the intensity score.

17. The method of claim 10, comprising receiving second data from the one or more sensors, the data indicative of a second valid input from a second guest to the interactive effect;
 estimating a second potential input range for the second guest based at least in part on the second data;
 determining a second intensity score within the intensity scale for the second valid input based on the estimated second potential input range and the second data; and
 generating second instructions to activate the interactive effect based on the second intensity score, wherein the generated second instructions adjust the activation level of the interactive effect based on the second intensity score.

18. The method of claim 10, wherein the data comprises guest identification information, a guest age, guest profile preferences, or a combination thereof.

19. A variable interactive effect system for controlling activation of an interactive effect, the system comprising:
 a system controller configured to receive input data from one or more sensors in an interactive environment that comprises an interactive effect, the system controller configured to:
  validate the input data as being a valid input to the interactive effect;
  determine that the input data does not match a preprogrammed interaction with the interactive effect;
  assess the input data according to one or more intensity metrics to generate an intensity score associated with the input data; and
  generate instructions configured to activate the interactive effect based on the intensity score, wherein a greater intensity score causes selection of a first activation level associated with a higher activation intensity of the interactive effect relative to a lesser intensity score that causes selection of a second activation level associated with a lower activation intensity of the interactive effect; and
 an interactive effect controller configured to activate the interactive effect according to a selected activation level based on the instructions.

20. The variable interactive effect system of claim 19, wherein a dynamic range of the interactive effect is scaled to a range of the intensity score.

21. The variable interactive effect system of claim 19, wherein the one or more intensity metrics comprise at least a velocity of guest movement, a trajectory of guest movement, or intensity characteristics of guest audio data.

22. The variable interactive effect system of claim 21, wherein the intensity characteristics of the guest audio data comprise volume and speed of speech.

* * * * *